US006922807B1

(12) United States Patent
Miyata

(10) Patent No.: US 6,922,807 B1
(45) Date of Patent: Jul. 26, 2005

(54) OBJECT EDITING APPARATUS AND METHOD, AND RECORDING MEDIUM STORING COMPUTER-READABLE PROGRAM

(75) Inventor: Hiroki Miyata, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/493,110

(22) Filed: Jan. 28, 2000

(30) Foreign Application Priority Data

Jan. 29, 1999 (JP) .......................................... 11-022944

(51) Int. Cl.[7] ................................................. G06K 9/36
(52) U.S. Cl. ....................... 715/508; 715/505; 715/506; 715/507; 715/526; 345/854; 717/108
(58) Field of Search ........................ 717/108; 382/302; 715/526, 507, 506, 508; 709/220; 345/735, 854; 235/379; 707/10, 102; G06K 9/36

(56) References Cited

U.S. PATENT DOCUMENTS

| 5,579,467 A | * | 11/1996 | Capps ......................... 715/507 |
| 5,640,577 A | * | 6/1997 | Scharmer .................... 715/507 |
| 5,940,844 A | * | 8/1999 | Cahill et al. ................. 715/526 |
| 5,953,523 A | * | 9/1999 | Martinez et al. ............ 717/108 |
| 6,034,689 A | * | 3/2000 | White et al. ................. 345/854 |
| 6,115,724 A | * | 9/2000 | Booker ........................ 715/526 |
| 6,226,656 B1 | * | 5/2001 | Zawadzki et al. .......... 715/506 |
| 6,282,547 B1 | * | 8/2001 | Hirsch ......................... 707/102 |
| 6,557,756 B1 | * | 5/2003 | Smith .......................... 235/379 |
| 6,594,405 B1 | * | 7/2003 | Flannery ..................... 382/302 |
| 6,600,497 B1 | * | 7/2003 | Gottfurcht et al. .......... 345/735 |
| 6,618,754 B1 | * | 9/2003 | Gosling ....................... 709/220 |
| 2001/0011276 A1 | * | 8/2001 | Durst, Jr. et al. ............. 707/10 |

FOREIGN PATENT DOCUMENTS

GB          2287819 A   *  9/1995  ............ G06K/9/36

OTHER PUBLICATIONS

"Microsoft Windows 95 Operating System First Step Guide," Sep. 1995, Microsoft Corporation, pp. 28–29.

* cited by examiner

Primary Examiner—Sanjiv Shah
Assistant Examiner—Gautam Sain
(74) Attorney, Agent, or Firm—Fitzpatrick, Cella, Harper & Scinto

(57) ABSTRACT

A form for being overlaid with print data is edited through a simple method. Specifically, a tree is displayed on a screen for editing a composite form. When an icon included in the tree is moved, editing is carried in such a manner that composite-form data takes on a structure that corresponds to the editing operation, the editing being performed in dependence upon the type of icon moved and in conformity with the type of icon located at the destination of movement.

28 Claims, 17 Drawing Sheets

401

×××CORPOLATION
YEAR: MONTH: DAY:

| PART | PRICE |
|------|-------|
|      |       |
|      |       |
|      |       |
|      |       |
|      |       |
|      |       |
|      |       |

402

1999 1 29

LBP      20,000
COPY     60,000
TAX       4,000
TOTAL    84,000

411 START REGISTRATION | 412 FORM DATA | 413 END REGISTRATION | 414 START OVERLAY | 415 DATA 1 | 416 DATA 2 | 417 END OVERLAY

FIG. 7

| FIELD(F) EDIT(E) DISPLAY(V) HELP(H) |
|---|

```
□-□ DOUBLE-SIDED
   ├-□ STATEMENT
   │      OF DELIVERY
   │      └─□ NOUHIN.fcp
   └─□ STATEMENT OF
          DELIVERY
          (DOUBLE-SIDED)
          └─□ NOUHIN_b.fcp
□-□ INVOICE
   └─□ SEIKYU.fcp
```

STATEMENT OF DELIVERY

CUSTOMER NAME:
DESTINATION NAME:
DESTINATION ADDRESS:

DELIVERY IS MADE AS FOLLOWS
TOTAL, INCLUDING TAX

| PRODUCT NAME | DELIVERY | QUANTITY |
|---|---|---|
| 1 | | |
| 2 | | |
| 3 | | |
| 4 | | |
| 5 | | |
| 6 | | |
| 7 | | |
| 8 | | |
| 9 | | |
| 10 | | |
| 11 | | |
| 12 | | |
| 13 | | |
| TOTAL | | |

701

| STATEMENT OF DELIVERY | STATEMENT OF DELIVERY (BACK SIDE) | INVOICE |

SET PRINTING ORDER AFTER PAGE IS ADDED.
PRINTING WILL BE PERFORMED IN THE ORDER DISPLAYED IN THE PREVIEW

[COMPOSITE-FORM SETTINGS FILE NAME]
　　　　　　　　　　　　　　　　C:¥Program Files¥Fcpro¥FORMWORK¥Test.fcx
[COMPOSITE-FORM SETTINGS DIRECTORY NAME]
　　　　　　　　　　　　　　　　C:¥Program Files¥Fcpro¥FORMWORK
101—[NUMBER OF PAGES]　　　　3
102—[PAGE NAME]　　　　　　　　Nenkin01
103—[NUMBER OF TIMES REPEATED]　OPTIONAL
104—[PAGE TYPE]　　　　　　　　STANDARD PAGE
105—[FILE NAME]
　　　C:¥Program Files¥Fcpro¥Samples¥Nenkin01.fcp 106 {
　　[PAGE NAME]　　　　　　　　Nenkin02
　　[NUMBER OF TIMES REPEATED]　OPTIONAL
　　[PAGE TYPE]　　　　　　　　STANDARD PAGE
　　[FILE NAME]
　　　C:¥Program Files¥Fcpro¥Samples¥Nenkin02.fcp
　　　C:¥Program Files¥Fcpro¥Samples¥Nenkin03.fcp
　　　C:¥Program Files¥Fcpro¥Samples¥Nenkin04.fcp 107 {
　　[PAGE NAME]　　　　　　　　Nenkin03
　　[NUMBER OF TIMES REPEATED]　OPTIONAL
　　[PAGE TYPE]　　　　　　　　STANDARD PAGE
　　[FILE NAME]
　　　C:¥Program Files¥Fcpro¥Samples¥Nenkin03.fcp

FIG. 10B

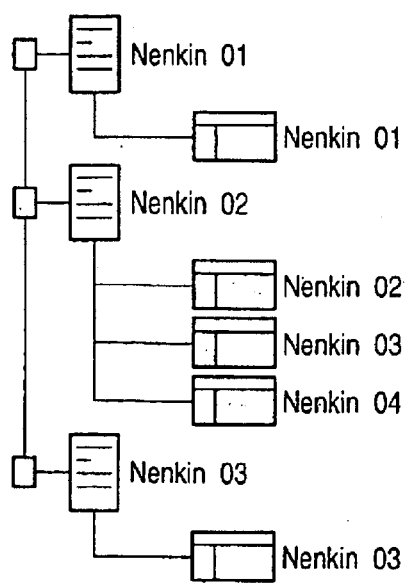

OBJECT EDITING APPARATUS AND METHOD, AND RECORDING MEDIUM STORING COMPUTER-READABLE PROGRAM

BACKGROUND OF THE INVENTION

This invention relates to an object editing apparatus and method in which an object such as form data for printing can be edited by manipulating a structure displayed in the form of a tree, as well as a storage medium storing a computer-readable program for implementing the object editing method.

A technique referred to as "form overlay" is used to create printed matter produced by writing data on a fixed form such as a bill. Form overlay involves creating, in advance, form data that represents the form portion, overlaying data that is not fixed (such data will be referred to as "print data" below), such as numerical values and character strings, are overlaied at prescribed locations of the form data, and then printing or displaying the result.

In order to implement such form overlay, form creating software that runs on a computer has been developed. With conventional software of this kind, the usual practice is to gather the form data usually on a per-page-basis. Some of this software additionally includes a function, referred to as a composite-form function, in which multiple pages of form data are combined to form a single set of form data. The composite-form function superimposes a plurality of pages of form data on a single page or, as in the case of a multiple-part slip or form for double-sided printing, combines a plurality of pages of form data into one set of form data.

However, if a plurality of pages of form data is combined to form a single composite form, it is necessary to create the form data of each page and how the form data of each of the pages is to be combined must be specified.

For example, not only must the form data to be combined be specified but it is also necessary to enter instructions, by commands and selection of menu items, etc., whether the data is to be combination for double-sided printing or whether the data is to be superimposed and combined into constitutes one page. As a consequence, the procedure for creating a composite form is complicated and it is difficult to increase productivity.

SUMMARY OF THE INVENTION

Accordingly, an object of the present invention is to provide an object editing apparatus and method in which a composite form can be composed or edited with ease by expressing and displaying the composition of a composite form as a tree structure and allowing a user to manipulate the tree structure.

According to the present invention, the foregoing object is attained by providing an object editing apparatus comprising: storage means for storing data which describes objects and a dependency relationship among these objects; display means for displaying, in accordance with this data, the objects and the dependency relationship thereof as a tree which connects image objects corresponding to the objects; operating means for editing and manipulating the image objects of the tree; and editing means for editing the description of the data in accordance with the editing operation performed by the operating means.

Preferably, the operating means includes an operation for moving or copying the image objects, and the editing means includes an operation for moving or copying, in conformity with the manipulation of an image object, the description of the object, corresponding to the image object that has been manipulated, in the data that has been stored in the storage means.

Preferably, the data is form data that is overlaid on print data, and the objects include a page which constitutes form data and a parts form which constitutes the page.

Preferably, in a case where an image object has been moved by the operating means onto an image object of a page, the editing means edits the form data in such a manner that if the moved image object is a parts form, the parts form corresponding to the moved image object will be added onto the end of a page located at the destination of movement.

Preferably, when an image object has been moved by the operating means onto an image object of a page, the editing means edits the form data in such a manner that if the moved image object is a page, a page corresponding to the moved image object will be added immediately ahead of a page located at the destination of movement.

Preferably, the form data further includes double sides which include the objects of two pages, and where an image object has been moved by the operating means onto an image object of a page, the editing means edits the form data in such a manner that if the moved image object is a page and a prescribed operation is performed along with the move operation, a double-sided object is generated which includes a page corresponding to the moved image object and a page located at the destination of movement.

Preferably, in a case where an image object has been moved by the operating means onto an image object indicating a part form, the editing means edits the form data in such a manner that if the moved image object is a parts form, a parts form corresponding to the moved image object will be added on immediately ahead of a parts form located at the destination of movement.

Preferably, in a case where an image object has been moved by the operating means to a position other than that of an image object, the editing means edits the form data in such a manner that if the moved image object is a parts form, a new page will be inserted at the end of the form data and a parts form corresponding to the moved image object will be inserted as a parts form included on this page.

Preferably, in a case where an image object has been moved by the operating means to a position other than that of an image object, the editing means edits the form data in such a manner that if the moved image object is a page, a page corresponding to the moved image object, inclusive of a parts form included on this page, will be added onto the end of the form data.

Preferably, the operating means includes an operation for moving an image object from outside the tree, and the editing means, in conformity with the manipulation of the object, adds the description of an object, which corresponds to an image object that has been moved, onto data that has been stored in the storage means.

Preferably, in a case where a prescribed operation has been performed by the operating means when an image object is moved, the editing means performs further editing, after the editing of the form data, in such a manner that an object corresponding to an image object that has been moved by the operating means is deleted from the position occupied prior to movement.

Other features and advantages of the present invention will be apparent from the following description taken in

BRIEF DESCRIPTION OF THE DRAWINGS

The accompanying drawings, which are incorporated in and constitute a part of the specification, illustrate embodiments of the invention and, together with the specification, serve to explain the principles of the invention.

FIG. 7 is a diagram showing an example of a composite form editing screen;

FIGS. 10A and 10B are diagrams illustrating a tree display and the content thereof in an example of composite-form data;

DESCRIPTION OF THE PREFERRED EMBODIMENTS

Preferred embodiments of the present invention will now be described in detail in accordance with the accompanying drawings.

Figure 1:
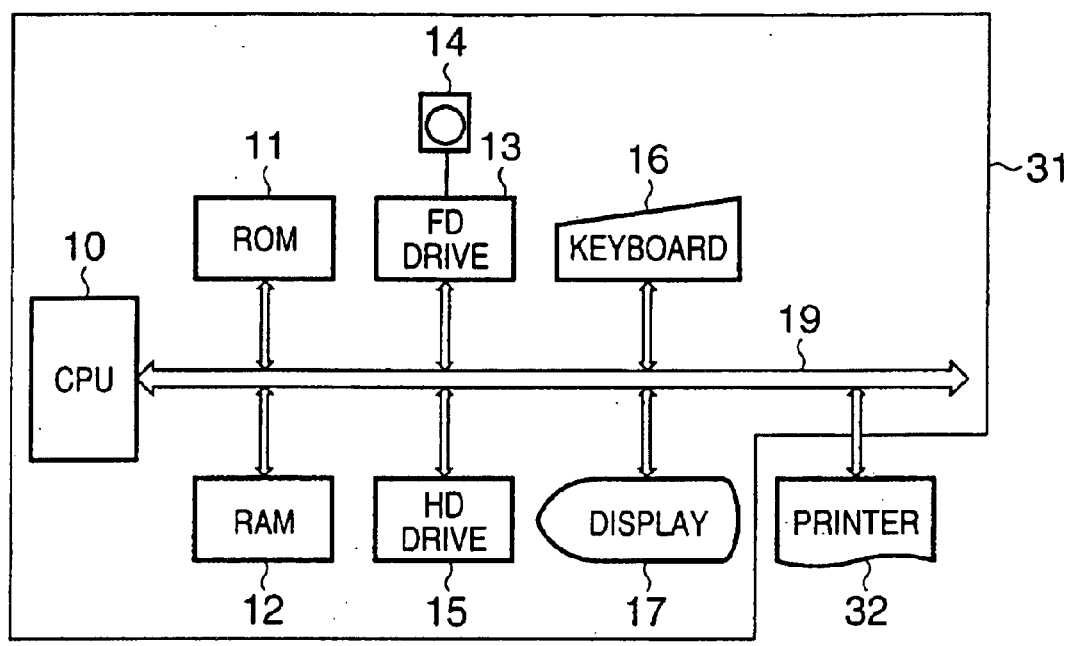
FIG. 1 is a block diagram illustrating the hardware configuration of an information processing system to which a printing scheme embodying the present invention is applied.
Figure 15:
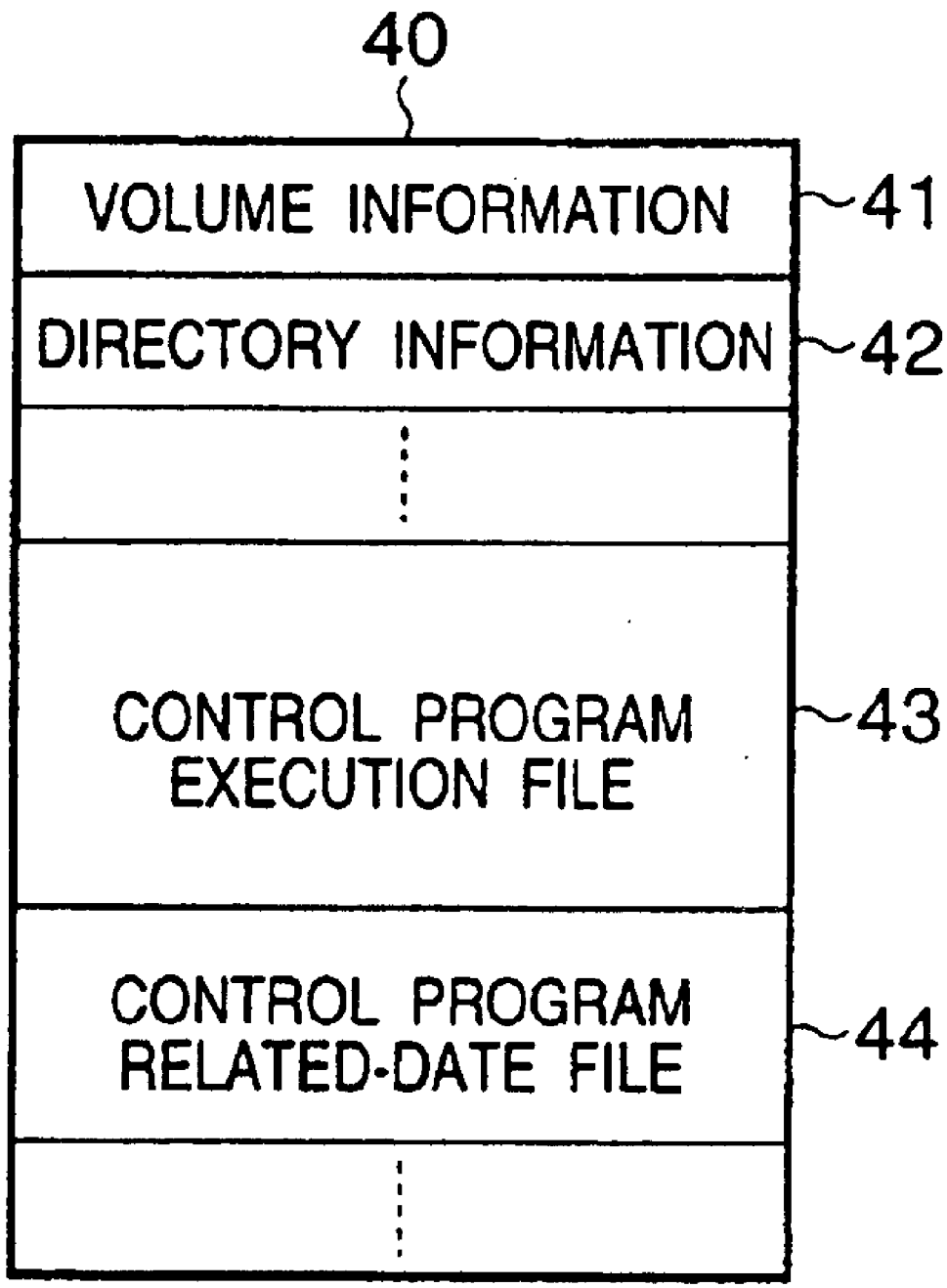
FIG. 15 is a diagram showing the content of a medium on which a form editor program and the like have been recorded.

FIG. 1 is a block diagram of a computer system having a form creating function according to an embodiment of the present invention. The form creating function operates by having a CPU 10 execute a basic input/output (I/O) program, an operating system (OS) and a form creating program. The basic I/O program is written in a ROM 11 and the operating system is written in a hard disk (HD) 15. When power is turned ON, the operating system is read into a RAM 12 from the hard disk 15 by an IPL (Initial Program Loading) function in the basic I/O program and the operating system starts. The processing procedure of the form creating program will be described later. The form creating program and related data are recorded on a floppy disk 14, the content of which is illustrated in FIG. 15.

Figure 2:
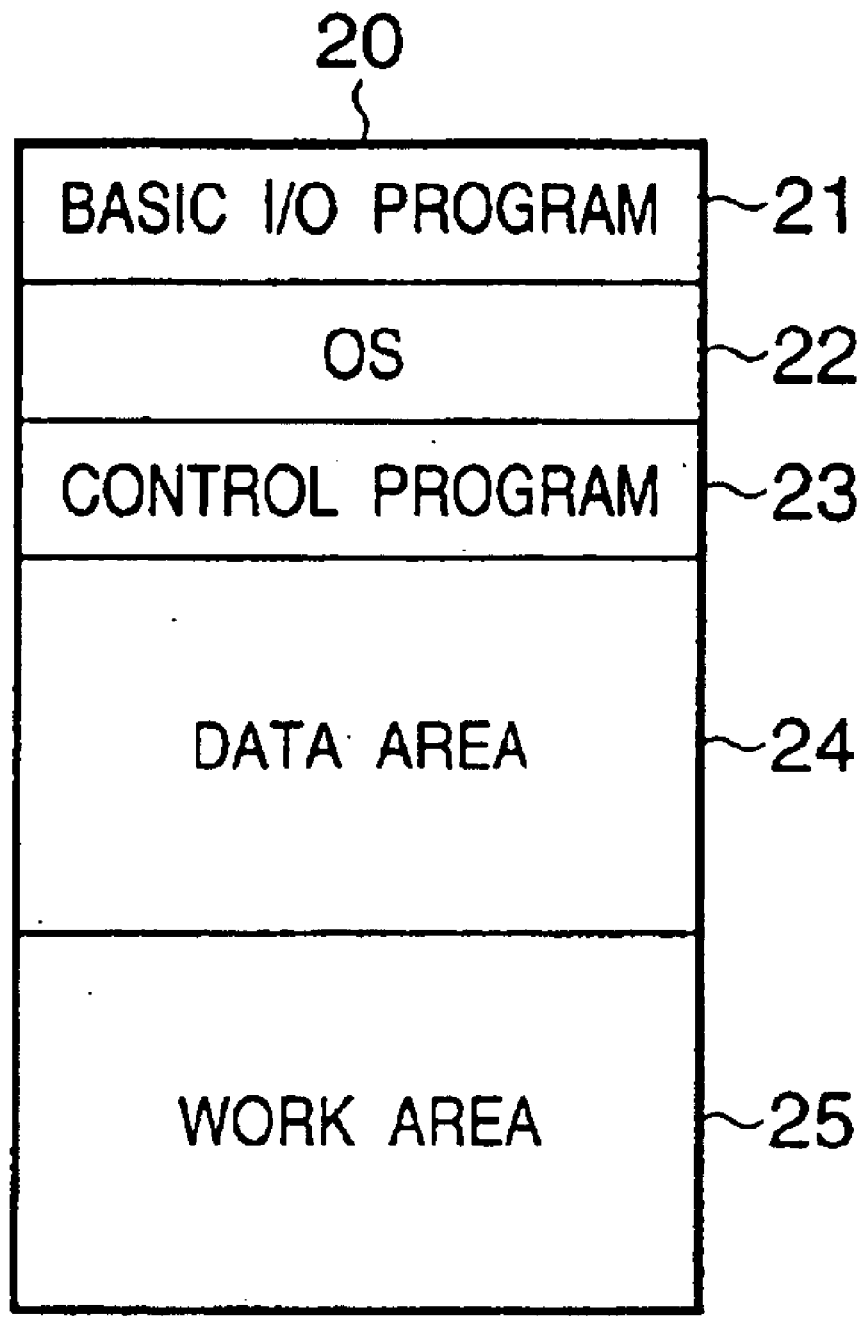
FIG. 2 is a diagram of a memory map which prevails at execution of a program of the printing scheme embodying the present invention.
Figure 16:
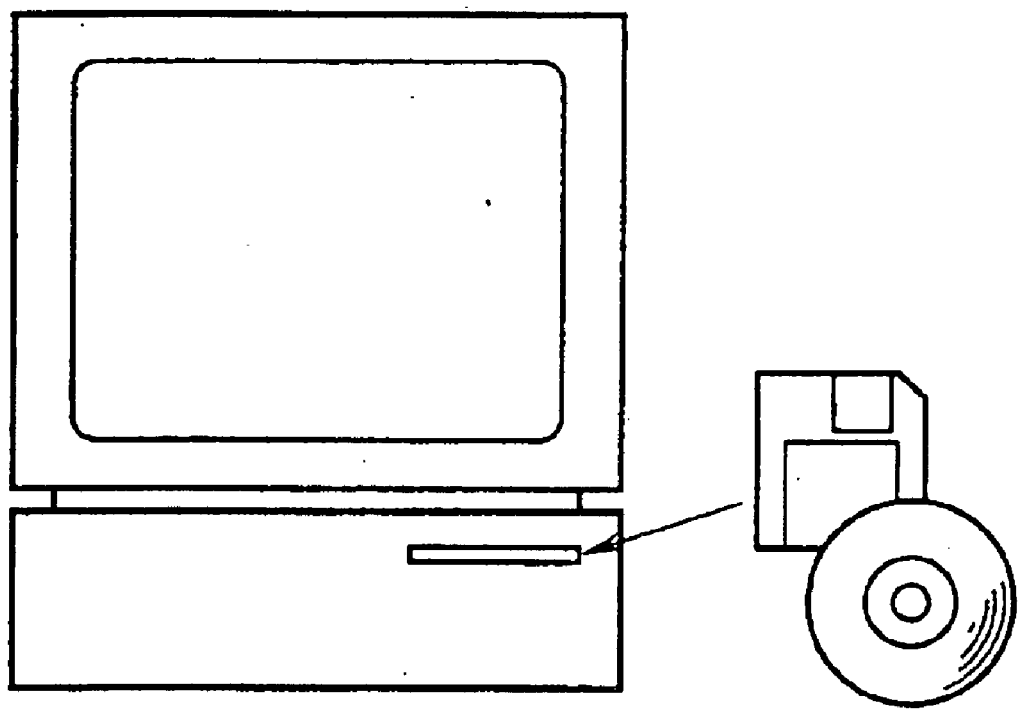
FIG. 16 is a diagram showing a program and data supplied from the medium of FIG. 15 to a computer or system.

The form creating program and related data that have been recorded on the floppy disk 14 can be loaded into this computer system through a floppy-disk drive 13, as shown in FIG. 16. When the floppy disk 14 is inserted into the floppy-disk drive 13, the form creating program and related data are read out of the floppy disk 14 and loaded in the RAM 12 under the control of the operating system and basic I/O program so that the program can be run. FIG. 2 illustrates a memory map which prevails when the form creating program has been loaded in the RAM 12 and is capable of being executed.

This embodiment illustrates an example in which the form creating program and related data are loaded directly from the floppy disk 14 to the RAM 12 and executed. However, an arrangement may be adopted in which the form creating program and related data are first stored (installed) in the hard disk 15 from the floppy disk 14, after which the form creating program and related data are loaded from the hard disk 15 to the RAM 12 when the form creating program is to be run. Further, the medium on which the form creating program is recorded is not limited to a floppy disk and may be a CD-ROM, an IC memory card, etc. Furthermore, a program for controlling the manipulation of an object on the tree is stored in the ROM 11, in advance, and the program is made part of the memory map. The program can also be executed directly by the CPU 10.

Form data that has been created by the form creating program is stored in the hard disk 15. This data is superimposed on print data by another application program for implementing overlay printing, and the result is output from a printer 32.

<Essentials of Form Overlay Processing>

Figure 3:
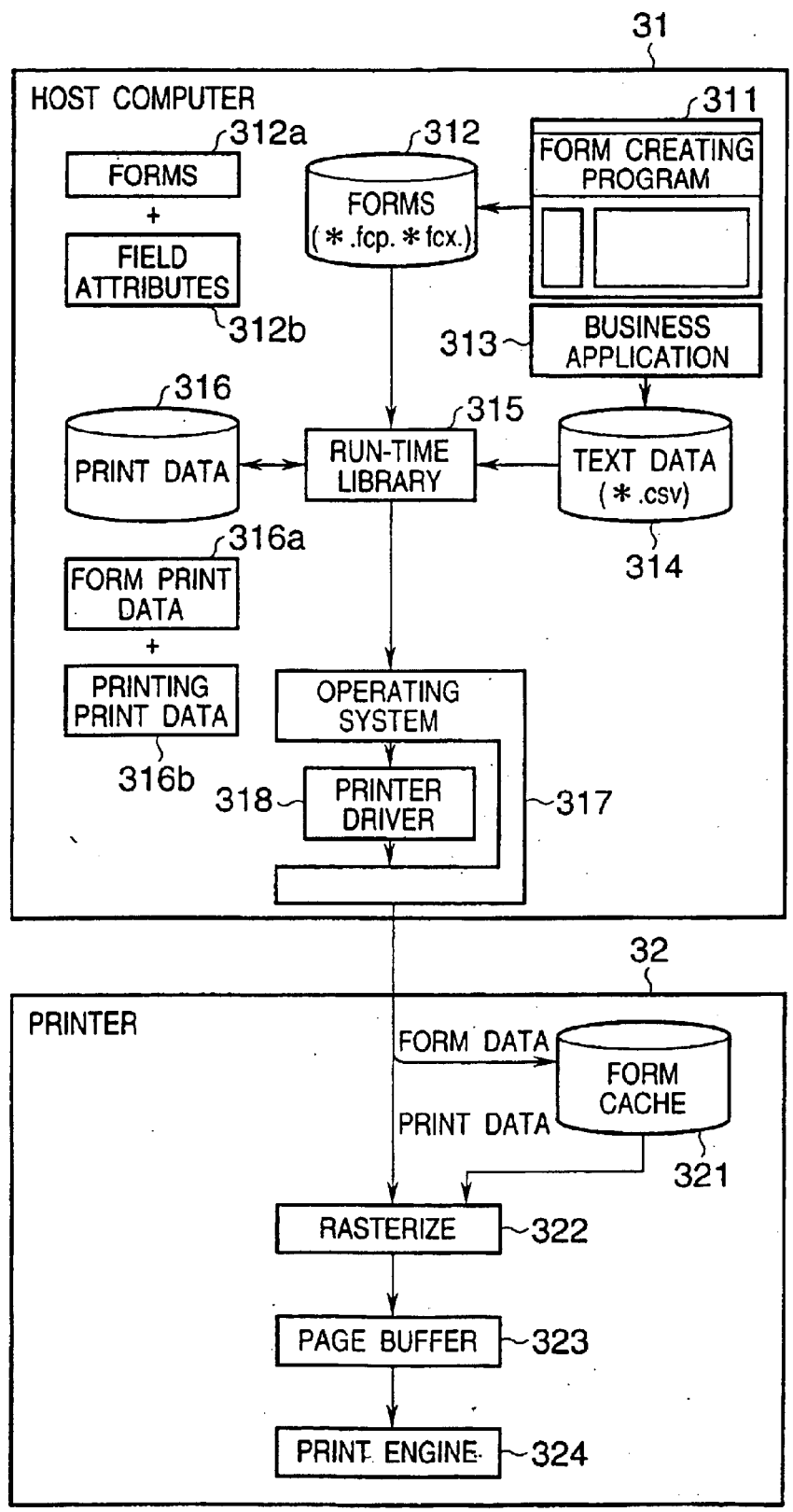
FIG. 3 is a diagram illustrating the essentials of form overlay processing.

The gist of the overlay processing will be discussed before describing the details of the form creating function. FIG. 3 illustrates the flow of processing regarding overlay processing, inclusive of the form creating program. A form or a composite form that has been created by a form creating program (also referred to as a "form editor" below) 311 is stored in a form data storage area 312 of the hard disk 15 or the like. Each form (inclusive of a composite form) includes form data 312a representing a itself, and field attribute data 312b which, in regard to print data combined with a form, represents the position of the data and the type of characters. From this point onward, the composite-form data will also be referred to as "FCX data", and form data that is not combined and constitutes the smallest unit of this data will be referred to as "FCP data".

These items of form data are converted by a prescribed run-time library 315 to form print data 316a, which has a format that can be interpreted by printer 32, and is stored in a print data storage area 316 secured in the hard disk 15.

Print data to undergo form overlay printing is generated from an appropriate business file 313 and stored in a text data storage area 314. It will suffice if this data has a format that allows the partitioning of each field that is to be overlaid. For example, it is possible to use a commonly utilized format referred to as a CSV format. This print data also is converted by the run-time library 315 to printing print data 316b having a format that can be interpreted by the printer 32 and is stored in the print data storage area 316.

The form data and the print data thus created is output to the printer 32 by an operating system 317 and a printer driver 318. The printer 32 combines the data and prints the result.

Figures 4A, 4B, 4C:
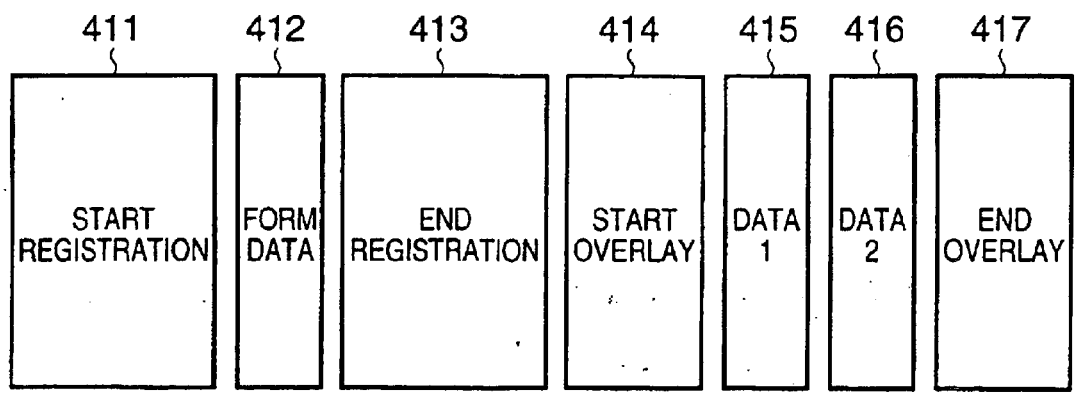
FIGS. 4A and 4B are diagrams illustrating examples of form data and print data, respectively.
FIG. 4C is a diagram showing a command sequence at the time of overlay printing.

FIGS. 4A and 4B illustrate examples of form data and print data, respectively, and FIG. 4C shows an example of a sequence of print command delivered to the printer 32. In FIG. 4C, a command sequence for starting a printing job is followed by a command 411 for starting the registration of form data. This is followed by form data 412 of the type depicted in FIG. 4A. In this example, the form data is for one page but the form data may represent a composite form that requires a plurality of pages. The form data 412 is followed by a command 413 to end the registration of form data. Next, between a command 414 for starting overlay printing and a command 417 for ending overlay printing, the printing of data 1 (415) and data 2 (416) are carried out in succession. An example of data 1 to be printed is shown in FIG. 4B. In the example of FIG. 4C, the print data is composed of two pages and therefore the form data also is a composite form of two pages.

When a command sequence of this kind is sent to the printer 32, the latter stores the form print data in a form cache 321 (FIG. 3), temporarily, rasterizes the print data and the form data and combines them in a page buffer 323. The resulting data is printed out by a print engine 324 to obtained the printed matter.

<Form Editor Function>

The foregoing is the gist of form overlay printing. The form creating program (form editor) of this embodiment will now be described with reference to the drawings.

Figure 5:
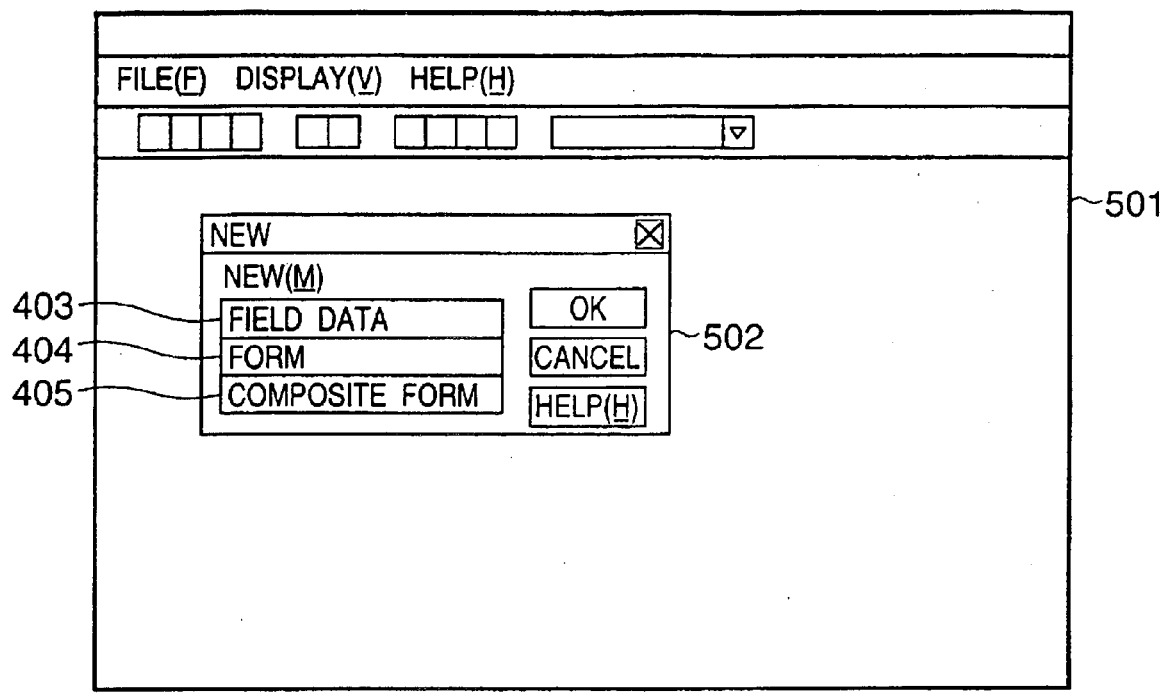
FIG. 5 is a diagram showing an example of a form editor start-up screen.
Figure 6:
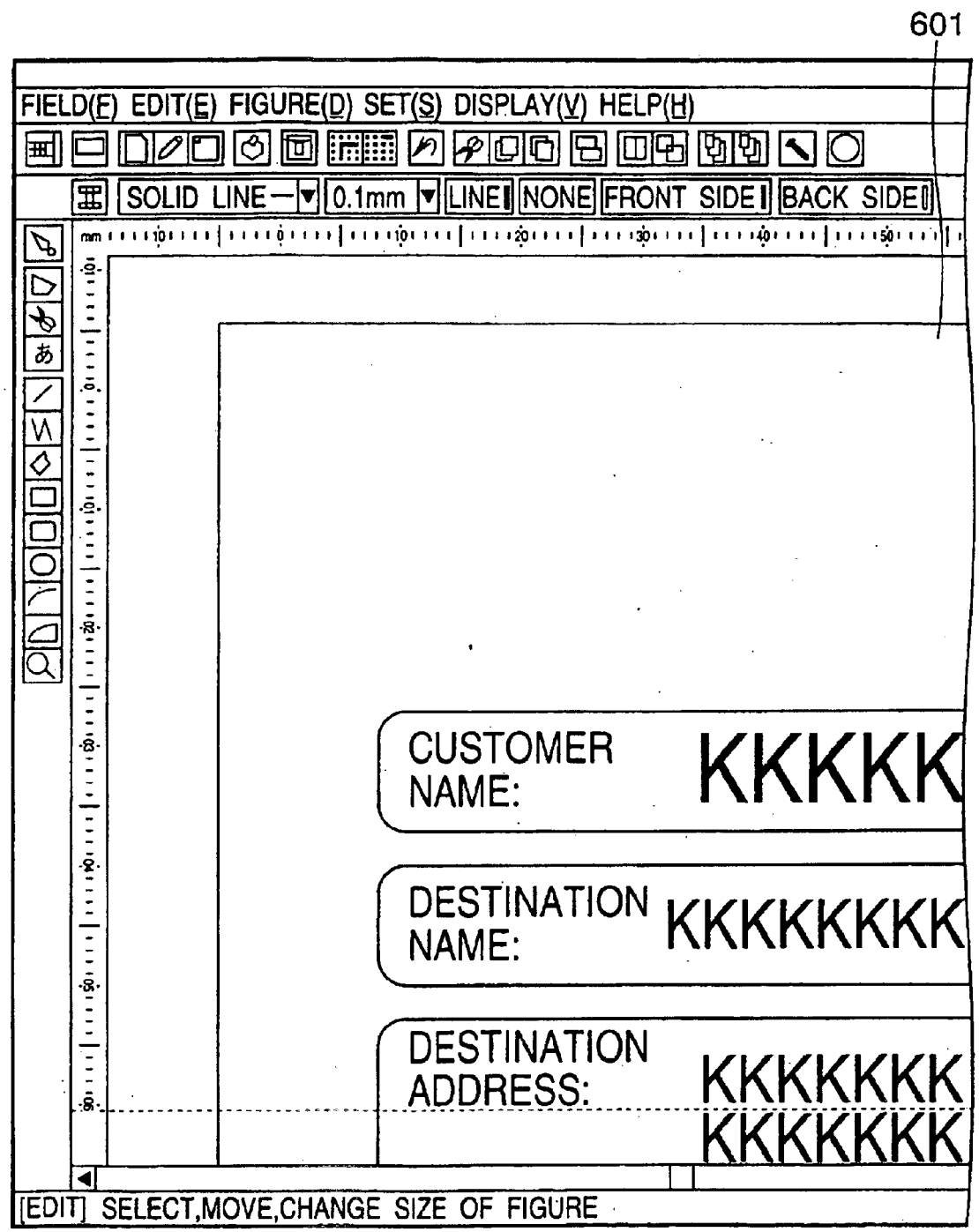
FIG. 6 is a diagram showing an example of a parts form editing screen.

FIG. 5 is an example of a display screen where the user specifies the creation of a new form after the form editor has been launched. A menu bar is displayed within a window 501 at the top of the screen. A window 502, for selecting an object to be newly created, is displayed in the window 501 below the menu bar. Here three types of objects can be selected, namely field data, a form and a composite form. When a field data section 403 is selected, from this point onward, a transition is made to a procedure for editing field attribute data 312b of FIG. 3. When a form section 404 is selected, a transition is made to a procedure for editing one page of parts form data. The parts form data can be one page of form data even when alone. FIG. 6 illustrates part of an example of a screen for creating parts form data in a case where the form section 404 has been designated. A parts form 601 is edited by operating buttons located along the edge of the window.

When a composite form section 405 (FIG. 5) is designated, a transition is made to the screen (FIG. 7) for editing the composite-form data. FIG. 7 illustrates the manner in which a composite form 701 is created. The structure of the composite-form data that is to be edited is displayed in a tree display section 702 on the screen for editing the composite-form data. An object designated on the screen can be manipulated, i.e., moved, erased, inserted, etc., using a pointing device, and the name of the object can be manipulated, i.e., changed, etc., using the keyboard. FIG. 5 illustrates a case in which a form is created, anew. However, where an already existing form or composite form is edited, it will suffice to specify the name of the composite-form data file and call the form editor. As a result, the composite-form data will be read out of the form data storage area 312 and a tree reflecting the structure thereof will be displayed.

Figure 8:
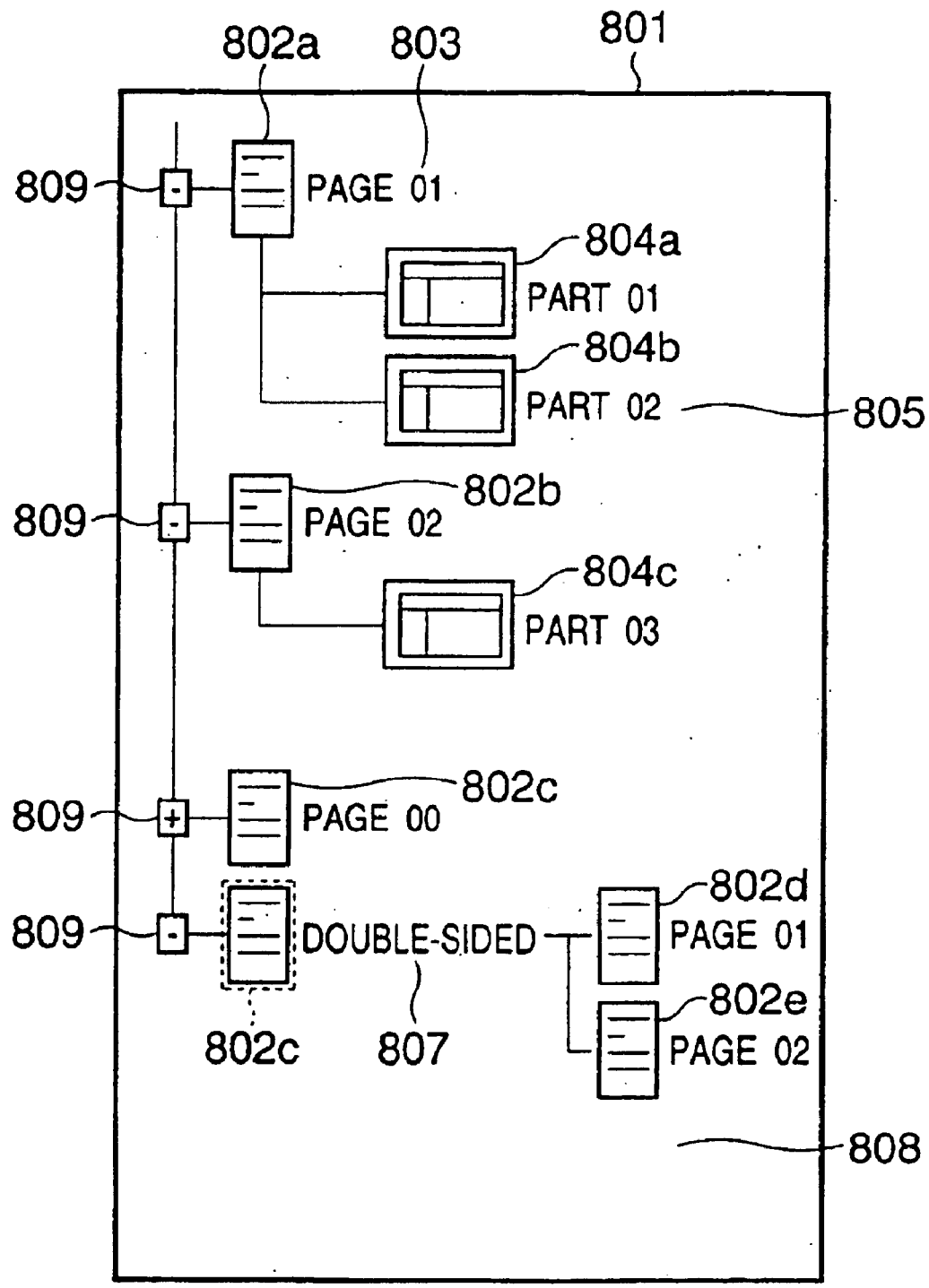
FIG. 8 is a diagram showing an example of the details of a tree structure displayed at the time of composite form editing.

FIG. 8 illustrates an example of displayed trees. The root of each tree represents the overall composite form, and underlying nodes 802a to 802c represent the print pages which make up the composite form. A print page represents one page to be printed, and there are several types depending upon the make-up of the page itself. For example, print pages 802a, 802b, 802c which simply include parts forms are composite forms obtained by superimposing the underlying parts forms from the top, in order. For instance, the print page 802a is constructed by superimposing a part 02 on a part 01. There is also a double-sided node 802c, which indicates that the underlying print pages are to be printed on both sides of a single page. Further, though not illustrated, there are also copy nodes indicating that a specified number of sheets are to be output repeatedly. In the case of a double-sided page, there are further underlying print pages. Of the pages present as subordinates in the display of the tree, the upper page signifies the front side and the lower page signifies the back side.

Further, in the nodes 809 connecting each of the print pages as subtrees, "−" indicates that the subtree is being displayed and "+" indicates that the subtree is not being displayed. A node which indicates an object will also be referred to as an "item" below. Further, each node is displayed as an image object referred to as an "icon", and a line connecting icons indicates that a node on the right side of the line is subordinate to the node on the left side.

Printing is performed in units of print pages and involves at least one parts form along with each print page. In the case of a print page in which a plurality of parts forms exists, the result of superimposing the parts forms is printed as one page. The order of parts forms subordinate to a page in the tree represents the order of overlay in a case where the parts forms are superimposed, and the forms are superimposed in regular order starting from the top in the tree. In other words, in a case where a page is displayed, the parts form at the bottom of the tree appears at the top of the displayed page.

FIG. 10A illustrates the structure of an example of composite-form data file which represents a composite form. In FIG. 10A, composite-form data "Test.fcx" is preserved in a directory "C:¥Program Files ¥Fcpro¥FORMWORK". In terms of content, a page number field 101 is 3, which indicates that three print pages are included. Page name 102 is the name of a defined print page. Here the name is "Nenkin01". Number of repeated pages 103 indicates the number of pages repeated. A page type field 104 indicates a standard page, i.e., an ordinary page which is not double-sided or a duplicate. A file name field 105 is displayed in the form of a full path, at the end of which the file name "Nenkin01.fcp" is written. That is, it is understood that this print page includes only "Nenkin01.fcp" as the parts form.

A subsequent print page Nenkin02 includes three parts forms "Nenkin0.2fcp", "Nenkin01.fcp" and "Nenkin0.4fcp".

The diagram obtained by expressing the composite-form data of FIG. 10A as a tree is as shown in FIG. 10B. The tree accurately expresses the content of the composite-form data and expresses the structure thereof in a format that can be understood intuitively in simple fashion.

<Composite Form Editing by Tree Editing>

Since the tree corresponds accurately to the composite-form data, the composite-form data can also be re-edited from the tree. With the form editor according to the present invention, the tree is edited in the tree display and this is reflected in the composite-form data.

The basic operation involving the tree will be described first.

Basic operation is of three types, namely "Select", "Drag" and "Drop". Since these operations are generally supported if the operating system has a graphical interface, their uses are quite common. With "Select", an icon displayed as a node appearing in a tree is designated using a keyboard or pointing device, whereby the icon is selected. As a result, the selected icon becomes the object of a subsequent drag operation. "Drag" is an operation which moves a selected icon to a desired position. "Drop" is an operation which releases he dragged icon at the desired position. The icon itself is moved to the desired position by the drag and drop operations. At the same time, the application in which these operations are performed is capable of obtaining information as to which icon was moved where. For example, the form editor also is capable of acquiring information indicating the results of these operations.

(Adding a Parts Form to a Page)

Figure 9:
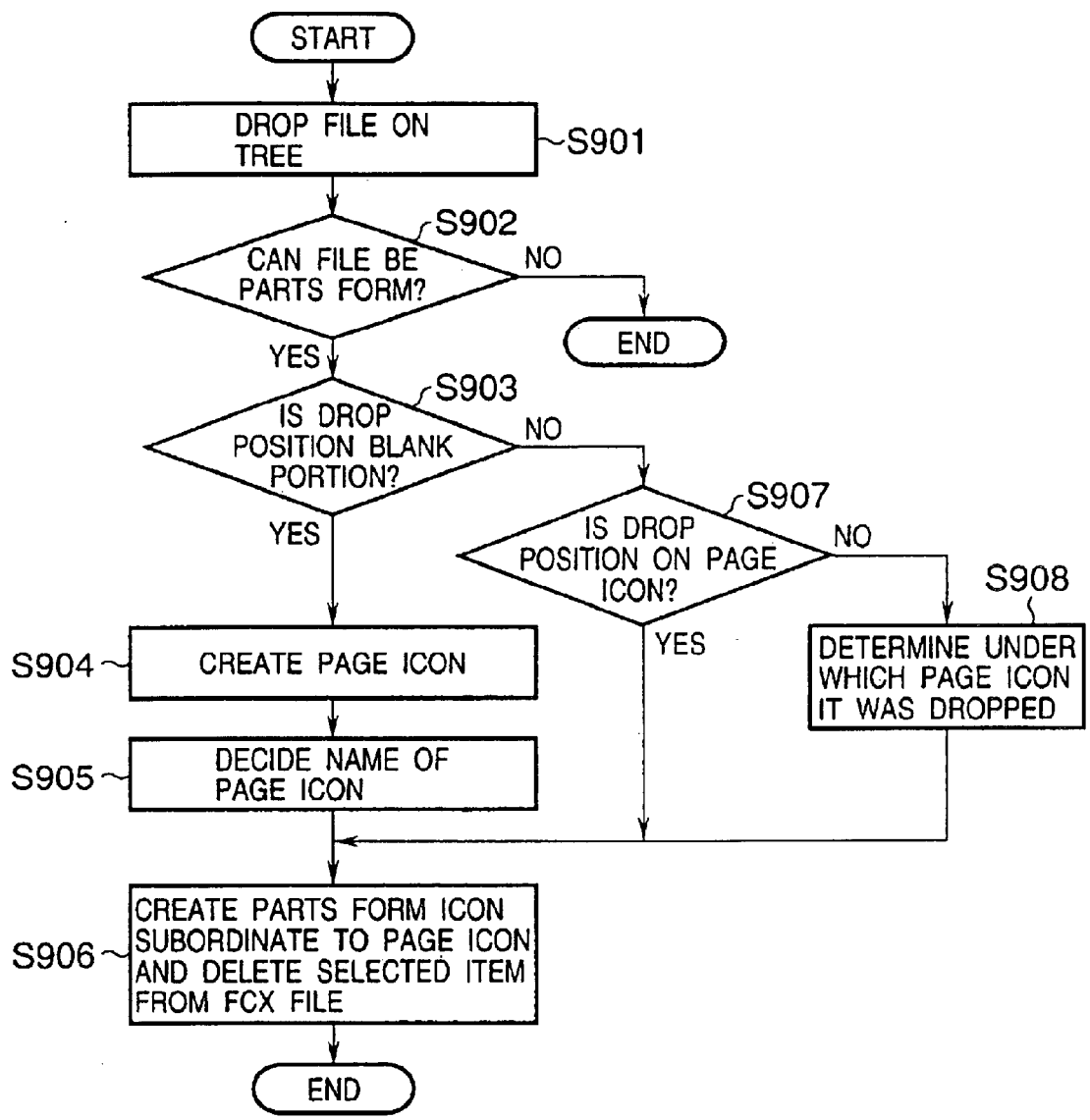
FIG. 9 is a flowchart showing composite form editing processing (1)

FIG. 9 is a flowchart illustrating the procedure for editing composite-form data on a tree. The procedure shown in FIG. 9 is for adding a new page to the tree of FIG. 8 or a new parts form to a page. The composite form that is to undergo editing is the tree displayed in the tree area 702 (FIG. 7).

The user doing the editing specifies the file desired to be registered as a parts form and drops the file at any position on the tree (provided it is within the bounds of the tree area 702 in FIG. 7) (step S901). If the operating environment is Microsoft's Windows, the file to be specified can be selected from files whose icons are displayed. File editor processing starts from step S902.

First, the file attribute corresponding to the dropped icon is investigated (step S902). In a case where the file cannot be a parts form, processing is terminated without changing the display of the tree preview. In this case the composite-form data also is not manipulated. If it is found at step S902 that the icon is the icon of a data file that can be a parts form, the position at which the icon was dropped is investigated (step S903). If the icon was dropped at a blank portion of the tree, an icon indicative of a new page is created (step S904). Next, the name from the dropped file name is applied to this page automatically (step S905). The name is one obtained by removing the extension from the dropped file name. At this time all existing page names are searched so that the new page name is not the same as an existing page name. It is possible to change the page name to any page name. In this case also, however, all registered page names are searched and a change cannot be made to an already existing page name.

Next, a dropped icon of form data is created subordinate to the icon indicative of the newly created page (step S906). This icon of form data is created as an icon indicating the part form that constructs the page. The name of the dropped file is used as the parts form name. If editing of the tree is finished, the content of the composite-form data also is changed so as to correspond to the edited tree. In a case where steps S904, S905 are traversed, the following fields are added onto the end of the composite form: page name (the same as the name of parts form), number of repeated pages, page type (standard) and file name (the file name of the parts form is expressed in the form of the full path).

If it is found at step S903 that the icon has not been dropped at a blank portion, then it is determined whether or not it was dropped on an icon which indicates the page of the tree (step S907). If the decision rendered is "YES", then the icon is added below the drop page as an icon indicating the parts form which constructs this page and a tree is created (step S906) and is displayed at the bottom of the tree. In this case, of the composite-form data, the parts form corresponding to the dropped icon is added onto the end of the file name field of the drop page.

If it is found at step S907 that the position at which the file was dropped is not on the icon indicating a page but on the icon indicating a parts form of the tree, then it is determined under which page icon the icon was dropped as a subordinate (step S908) and the icon is registered as an icon indicating a parts form subordinate to the icon indicative of the page to which the icon indicating this parts form belongs (step S906). At this time the icon that was dropped is displayed in the tree immediately ahead of the icon indicating the parts form at the drop position. In this case, the composite-data file is manipulated, as follows, at step S906: the parts form name corresponding to the dropped icon is inserted immediately after the parts form file on the page to which the parts form at the drop position belongs.

In a case where a file has been dragged to a page on which a parts file having the same name exists, a warning message is displayed and the parts form is not added on.

This editing is such that when a new page is to be registered in the tree, the new page and its part form are registered in the tree merely by dragging the file desired to be utilized as the parts form to the blank portion of the tree. As a result, it is possible to eliminate the labor of creating beforehand a page which includes a parts form.

(Moving an Item)

Figure 11:
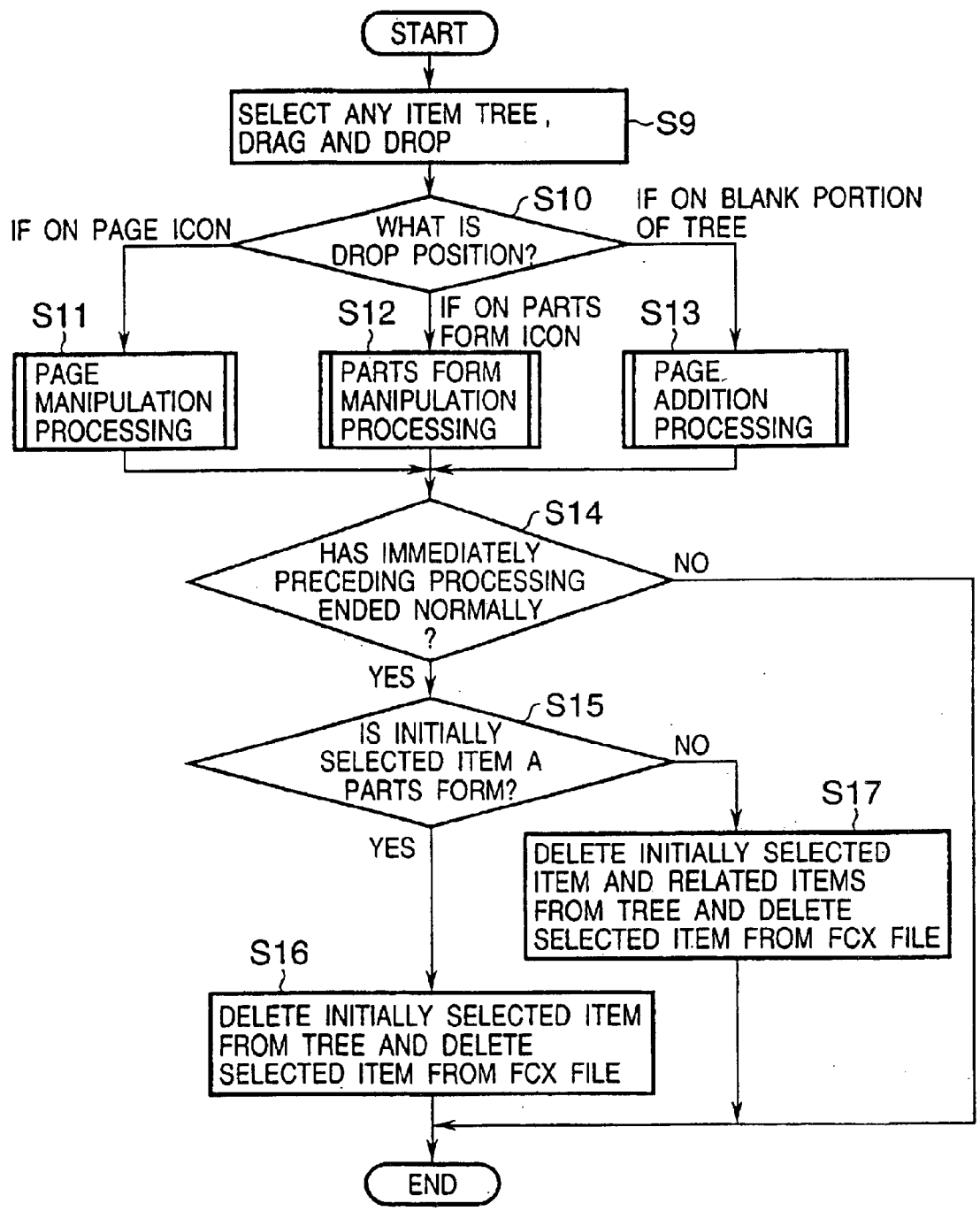
FIG. 11 is a flowchart showing composite form editing processing (2)

FIG. 11 illustrates a procedure for moving an item such as a parts form or page being displayed on the tree of FIG. 8.

The user selects an icon indicating a desired item from the tree, drags the icon and drops it at a position in the tree (step S9). The position at which the icon was dropped is investigated (step S10). If the position is on an icon indicating a page, then processing relating to page manipulation is executed (step S11). If the position is on an icon indicating a parts form, then processing relating to parts form manipulation is executed (step S12). If the position is a blank portion of the tree, then page addition processing is executed (step S13). The details of these processing steps will be described later. When these operations are finished, it is judged whether or not they have ended normally (step S14). If the decision is "NO", then operation is terminated. If the decision is "YES", however, then it is determined what the selected icon is (step S15).

If it is found at step S15 that the selected, dragged and dropped item is a parts form, then this parts form is deleted from the original position of the tree. Further, along with this, the file name of the deleted parts form is deleted from the page to which this file name belongs in the composite-form data file (FCX file) (step S16).

In a case where the selected icon is one which indicates the page, this icon and the icon indicating the parts form that constructs this page are all deleted from the original positions in the tree. Further, along with this, the deleted page and the file name of the parts form included on this page are deleted from the file in the composite-form data file (FCX file) (step S17).

(Page Manipulation)

Figure 12:
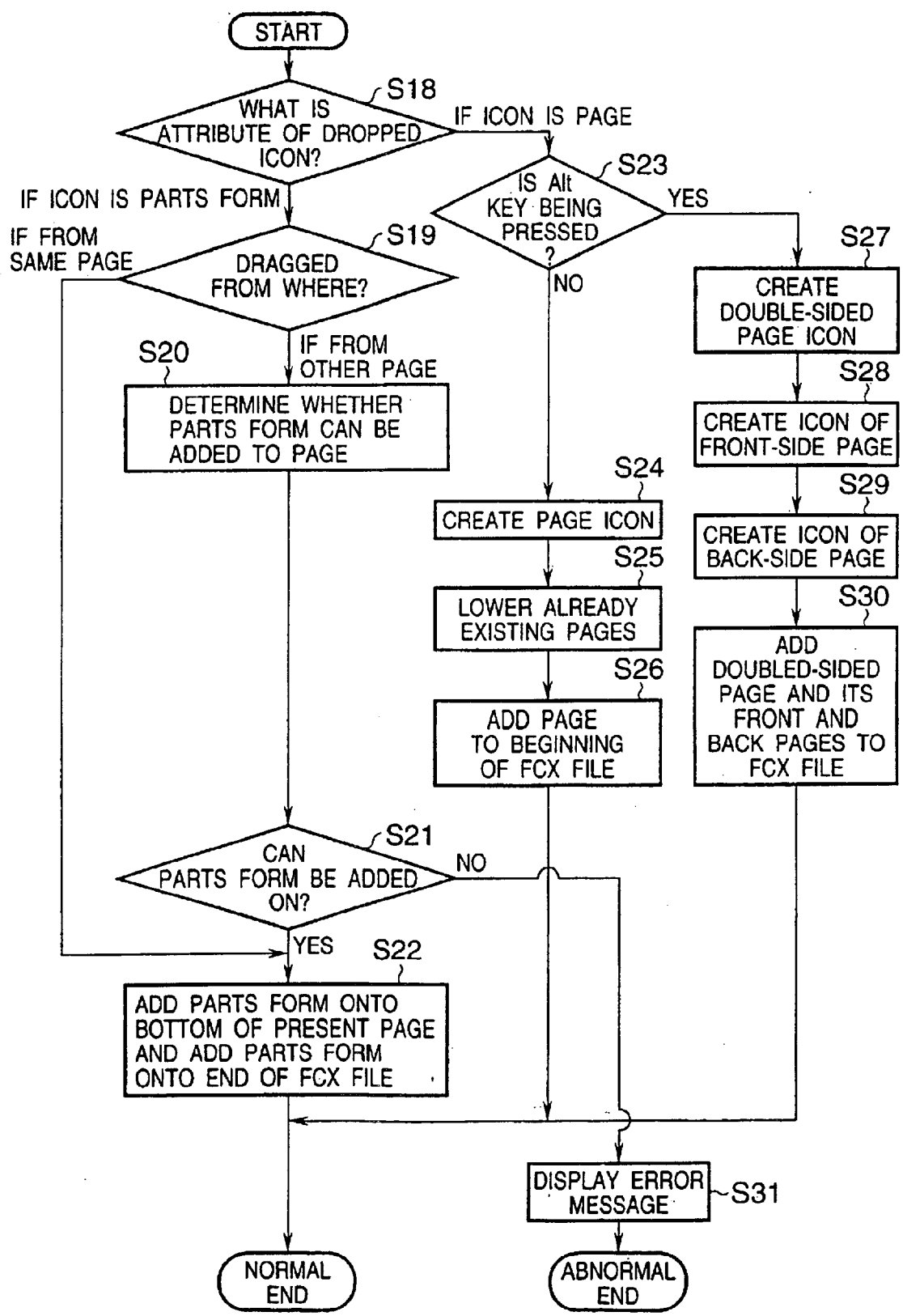
FIG. 12 is a flowchart showing composite form editing processing (3)

FIG. 12 illustrates a procedure relating to page manipulation at step S11 in FIG. 11. First, the attribute of the dropped icon, i.e., the selected icon, is examined (step S18). If the icon indicates a parts form, it is determined whether or not it has been dragged from another page, i.e., whether or not it is a parts form that has been moved from another page (step S19). If the icon has been dragged from another page, then the number of parts forms managed by the page at the position where the icon was dropped is examined (step S20) and it is determined whether or not the parts form can be added on (step S21).

If the parts form can be added on, then it is registered, as a subordinate to the icon indicating the page on which the operating system was dropped, as an icon indicative of the parts form at the bottom of icons indicating already existing parts forms (step S22). Operation then ends normally. Concurrently, at step S22, the file name corresponding to the parts form icon that was selected and dragged is added onto the page corresponding to the page icon for which the parts form has been registered, this page being included in the composite-form data file (FCX file) undergoing manipulation. In other words, in this case the parts form that has been selected is copied from the page that was the origin of the drag to the page that is the destination of the drag. At step S16 the parts form that was the copying source is deleted and ultimately undergoes a move operation. The parts form that has been moved is attached to the bottom of the page and, in terms of the image, is overlaid as the topmost form.

If it is found at step S21 that the parts form cannot be added on, an error message is displayed (step S31) and operation ends abnormally.

If it is found at step S19 that the icon was dragged from a parts form on the same page, then the dragged parts form icon is registered, as a subordinate to the icon indicating the page, as a parts form at the bottom of the icons indicating already existing parts formed (step S22) and operation ends normally. Concurrently, at step S22, the file name corresponding to the parts form icon that was selected and dragged is added onto the page corresponding to the page icon for which the parts form has been registered, this page being included in the composite-form data file,(FCX file) undergoing manipulation. In other words, in this case the parts form file that has been selected is copied at the bottom of the page to which this file belongs. At step S16 the parts form that was the copying source is deleted and ultimately undergoes a move operation. The parts form that has been moved is attached to the bottom of the page and, in terms of the image, is overlaid as the topmost form.

If it is found at step S18 that the attribute of the dropped icon is an icon indicative of a page, it is determined whether or not a specific key, e.g., an "Alt" key of an AT-type compatible computer manufactured by IBM, is being pressed (step S23). If the Alt key is not being pressed, an icon indicating the selected page is created anew at the drop position (step S24). Icons following the icon indicating the page that was at the drop position are moved downward by an amount equivalent to the icon created at the lower part of the tree (step S25). Control then proceeds to step S26, at which, in the FCX file that is the object of manipulation, the description corresponding to the selected page icon is added immediately ahead of the page description corresponding to the dropped page icon. Operation then ends normally.

By way of example, assume that the page icon "Nenkin01" has been selected, dragged and dropped on the page icon "Nenkin03" in FIG. 10B. In this case, the page icon "Nenkin01", inclusive of the parts form constituting this page, is copied between the page icon "Nenkin02" and the page icon "Nenkin03". This manipulation is reflected in the FCX file at step S26. That is, the page description "Nenkin01" (reference numerals 102 to 105) in FIG. 10A is moved between the page description "Nenkin02" (106) and the page description "Nenkin03" (107). Since the original page icon selected and the corresponding page description are deleted at step S17, the end result is a move operation.

If it is found at step S23 that the Alt key is pressed, an icon representing "Double-sided" is created on the upper layer of the icon indicating the page (step 27) and, subordinate thereto, the icon indicative of the selected page becomes the front side (step S28) and the icon indicative of the page to which the selected page is moved is created as the back side (step S29). This icon is the icon indicative of "Double-sided", such as icon 802c in FIG. 8. Manipulation of the FCX file corresponding to the creation of the double-sided form is performed at step S30. Specifically, the page description corresponding to the selected page icon is added on immediately ahead of the dropped page icon. Operation then ends. It should be noted that the "Page Type" section of the page description corresponding to the icon that has been added on is assumed to be a code representing "Double-sided, for example, and the "Page Type" section of the page description corresponding to the icon that is destination of the drop is assumed to be a code representing "Back Side".

Thus, by selecting a desired icon in the tree and moving this icon to a desired position by drag and drop operations, the composite-form data file can be edited in conformity with the type of selected item.

(Parts form Manipulation)

Figure 13:
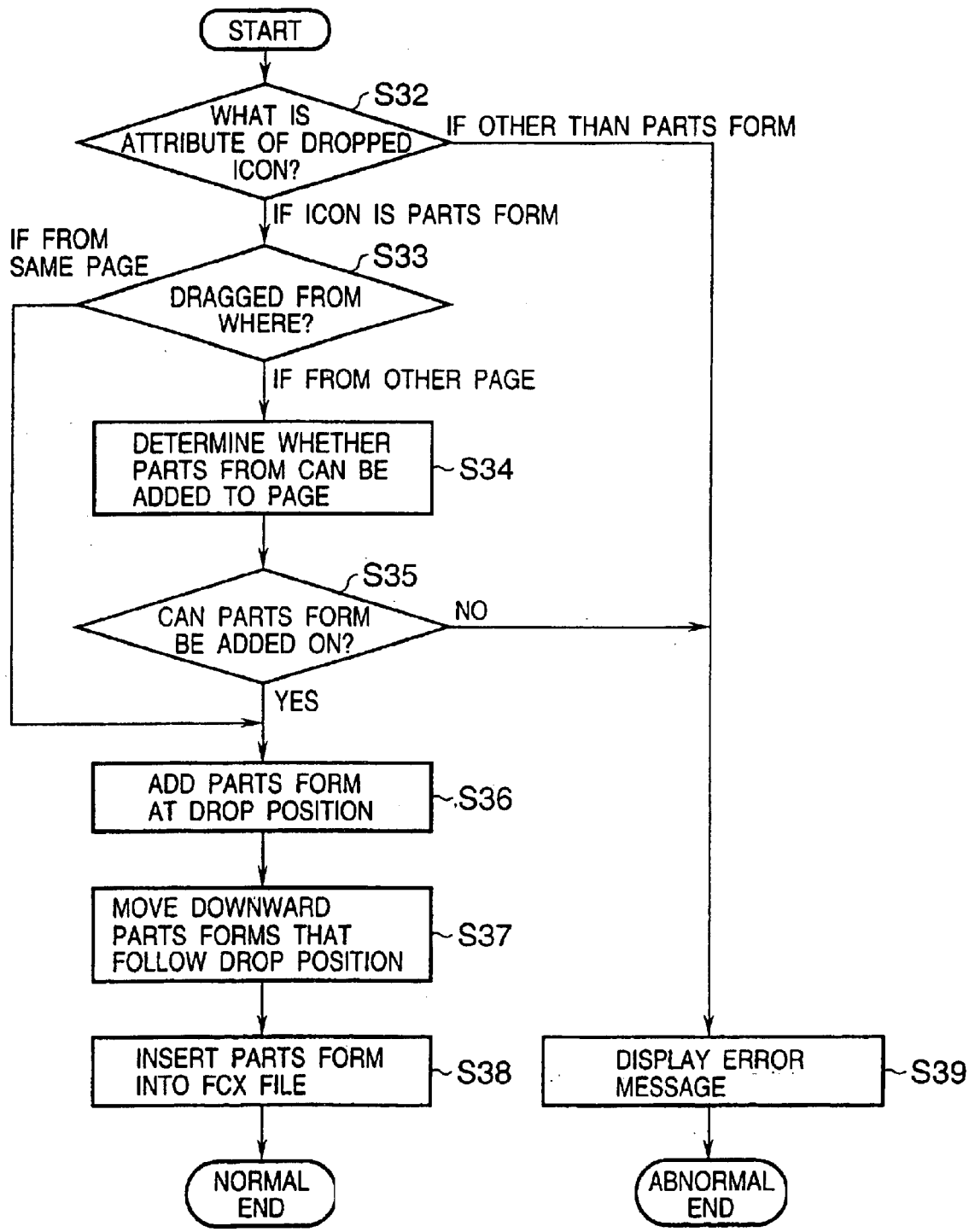
FIG. 13 is a flowchart showing composite form editing processing (4)

FIG. 13 illustrates a procedure relating to parts form manipulation at step S12 in FIG. 11. First, the attribute of the dropped icon, i.e., the selected icon, is examined (step S32). If the selected icon is an icon other than one which indicates a parts form, an error message or the like is displayed (step S39) and operation ends abnormally. If it is found at step S32 that the icon is one indicating a parts form, then whether or not this is an icon that was dragged from another page or not is determined based upon whether or not the selected parts form and the parts form that is the destination of movement belong to a different page (step S33).

If the icon has been dragged from another page, then it is determined whether or not the parts form is capable of being added onto the page that manages the parts form at the drop position (step S34). If the parts form cannot be added on, an error message or the like is displayed (step S39) and operation is terminated abnormally.

In a case where it is found at step S35 that the parts form can be added on and in case of an operation to move the parts form within the same page, an icon indicating the parts form is created at the drop position (step S36) and icons following the icon present at the drop position are moved to the lower part of the tree (step S37). Operation then ends normally. Finally, at step S38, the parts form file corresponding to the selected icon is added onto the page corresponding to the destination of movement in the FCX file that is the object of editing. In other words, the selected parts form file name is inserted immediately ahead of the parts form file section corresponding to the icon moved to the lower part of the tree at step S37. Operation then ends.

Thus, by way of the procedure described above, by moving another parts form icon onto a parts form icon, the parts form corresponding to the moved icon can be inserted into a page.

(Moving a Page)

Figure 14:
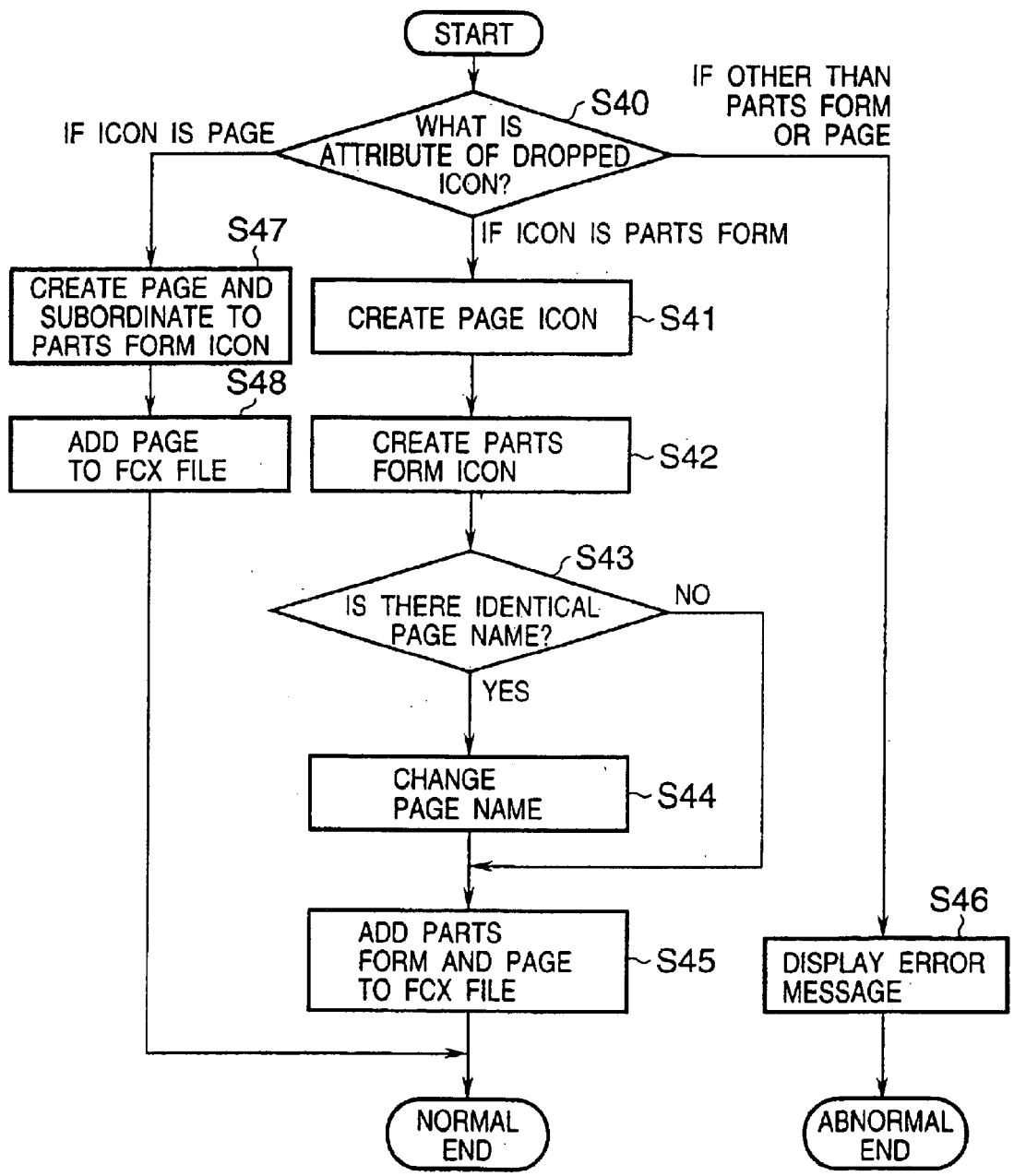
FIG. 14 is a flowchart showing composite form editing processing (5)

FIG. 14 illustrates a procedure relating processing for adding on a page. First, the attribute of the dropped icon, i.e., the selected icon, is examined (step S40). If the attribute of the dropped icon is other than that of an icon indicating a page and an icon indicating a parts form, an error message or the like is displayed (step S46) and operation ends abnormally.

If it is found at step S40 that an icon indicating a parts form has been dropped, an icon indicating a new page is created anew (step S41) and then an icon indicating the dropped parts form is created subordinate to the newly created icon (step S42). At this time the newly created page name is decided automatically from the dropped icon name. Next, it is determined whether or not an identical page name already exists (step S43). If the answer is "YES", the page name is changed automatically (step S44). Next, in the FCX file undergoing editing, the page description decided at step S42 or S44 is added onto the end and the parts form file name corresponding to the selected parts form icon is written in as the parts form file belonging to this page (step S45).

If it is found at step S40 that the icon indicating the page has been dropped on a blank portion of the tree, i.e., that the selected icon is a page icon and that the page icon has been moved to the blank portion, an icon indicating the page and an icon indicating the parts form are created from the dropped icon at the end of the page included in the composite form, inclusive of the parts form managed by the page (step S47). Furthermore, the description of the selected page is copied to the end of the FCX file undergoing editing (step S48).

Thus, in accordance with the procedure described above, moving the icon of a page to a blank portion of the tree makes it possible to move a selected page within a composite form. Further, by moving the icon of a parts form to the blank portion of a tree, a page which includes the selected parts form can be created anew.

In accordance with the form editor of this embodiment, as described above, composite-form data can be edited by selecting and moving a desired icon by drag and drop operations from among icons indicating items such as a page and parts form displayed by another application or the like. For example, if a file that can become a parts form is moved to a blank portion of a tree, a new page that includes this parts form will be created in the parts form. If the file is moved onto a page icon, the selected parts form will be added to this page.

Further, in accordance with the form editor of this embodiment, composite-form data can be edited by selecting and moving a desired icon by drag and drop operations from among icons indicating items such as a page and parts form displayed by a tree of the form editor. For example, if the destination of movement of an item is a page icon in a tree and the selected item is a parts form, the selected parts form will be moved to the page that is the destination of movement. If the selected item is a page, the page will be added to the beginning of the composite form. If a specific key such as an Alt key is being pressed at this time, a double-sided page, in which the selected page is the front and the page that is the destination is the back, will be added to the composite form.

Further, if the destination of movement of an item is a parts form in the tree and the selected item also is a parts form, the selected parts form will be moved immediately ahead of the parts form that is the destination of movement.

Further, if a selected item is a parts form in a case where the destination of movement of the item is a blank portion in the tree, a new page which includes this parts form is added to the end of the composite form. If the selected item is a page, then this page is moved to the end of the composite form.

Further, it is possible to perform an editing operation in which, by carrying out an operation to erase an icon in a state in which the icon has been selected in a tree, the page and parts form corresponding to the erased icon are erased from the composite-form data file.

[Second Embodiment]

Figure 17:
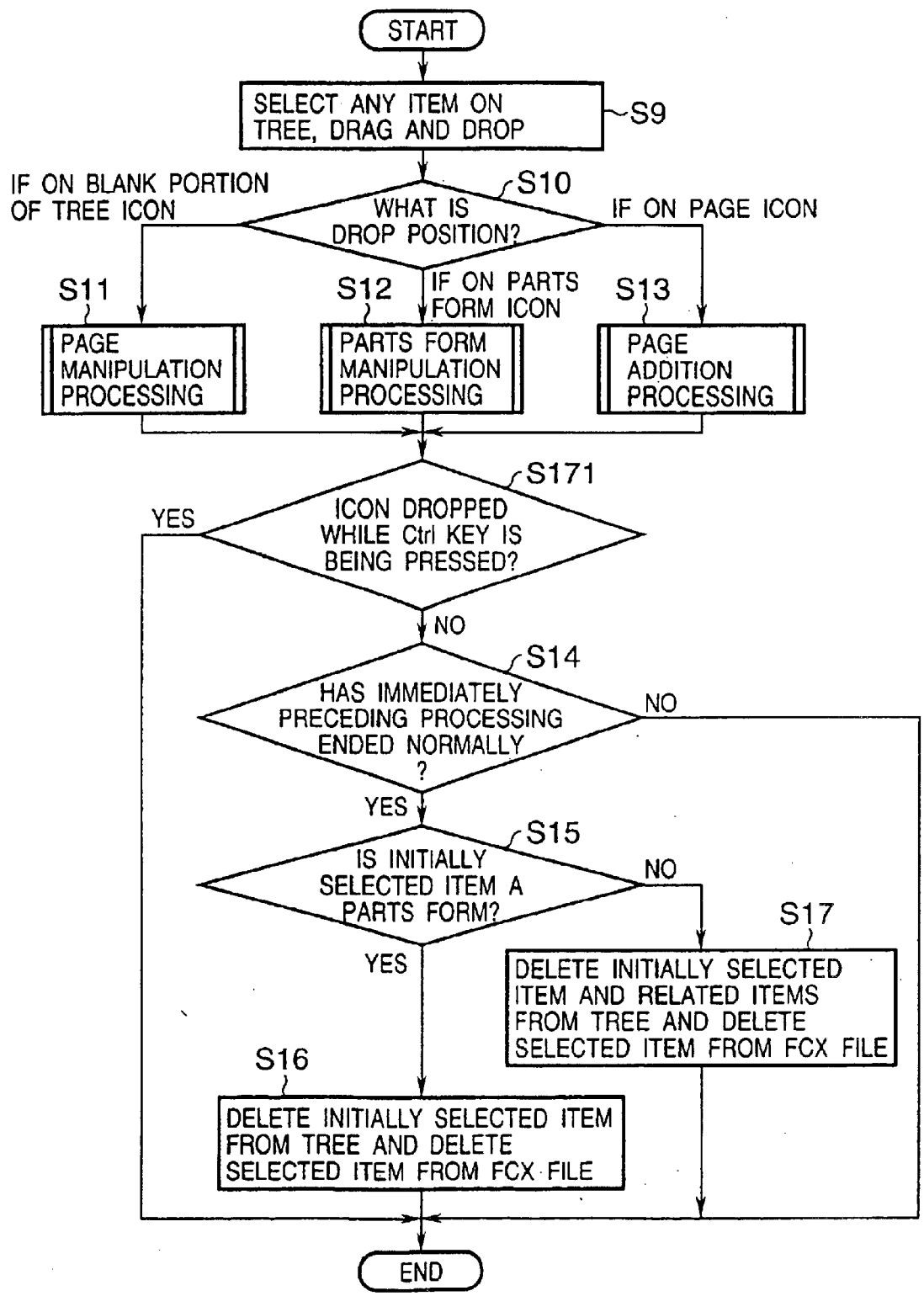
FIG. 17 is a flowchart illustrating composite form editing processing according to a second embodiment of the present invention.

The flow of a second embodiment is illustrated in FIG. 17, which illustrates a procedure executed instead of the procedure shown in FIG. 11 of the first embodiment. This embodiment differs from the first embodiment only in step S171. Since the other steps are the same, only step S171 will be described. According to step S171, when an icon indicating a selected parts form is moved and dropped, whether or not a specific key, e.g., a control key (Ctrl key), has pressed is determined before the selected item is deleted. If the control key is not pressed, a procedure similar to that of the first embodiment is executed. If the key is in pressed, however, deletion of the initially selected item is skipped. In other words, the initially selected item is copied and not moved.

As a result, a parts form constituting a page can be copied as the parts form of another page. This enhances greatly the versatility of the editing operation.

Thus, in accordance with the present invention, as described above, a composite form is displayed in a tree having a hierarchical structure, and an image object such as an icon representing an object constituting the composite form is selected and moved in the tree, thereby making it possible to edit the data file of the composite form. Based upon the position to which the image object has been moved, the parent object of this object can be created and, at the same time, this object can be created as a child object. Further, a double-sided page can be created in simple fashion by editing the tree.

Note that the present invention may be applied to either a system constituted by a plurality of devices (e.g., a host computer, an interface device, a reader, a printer and the like), or to an apparatus consisting of a single item of equipment (e.g., a copying machine, a facsimile machine or the like).

As many apparently widely different embodiments of the present invention can be made without departing from the spirit and scope thereof, it is to be understood that the invention is not limited to the specific embodiments thereof except as defined in the appended claims.

What is claimed is:

1. A composite form editing apparatus for editing form data, which is constituted of a plurality of parts forms, to be overlaid on print data, said apparatus comprising:

storage means for storing composite form setting data which describes objects and a dependency relationship among these objects, where the objects include a page which constitutes the form data and a parts form which constitutes the page;

display means for displaying, on a display in accordance with the composite form setting data, the objects and the dependency relationship thereof as a tree which connects image objects corresponding to the objects;

determination means for determining a position where the image objects is dropped on the tree in accordance with an operation by an operator; and editing means for editing the description of the composite form setting data in accordance with the position where the image object is dropped determined by said determination means.

2. The apparatus according to claim 1, wherein the operation by the operator includes an operation for moving or copying the image objects; and said editing means includes an operation for moving or copying, in conformity with the manipulation of an image object, the description of the object, which corresponds to the image object that has been manipulated, in the composite form setting data that has been stored in said storage means.

3. The apparatus according to claim 2, wherein a name of the parts from constituting a page composing the form data is described in the composite form setting data as well as a type of page indicating whether a page is subject of both side printing with respect to each page.

4. The apparatus according to claim 3, wherein in a case where an image object has been moved by the operator onto an image object indicating a page, said editing means edits the form data in such a manner that if the moved image object is a parts form, a parts form corresponding to the moved image object will be added onto the end of a page located at the destination of movement.

5. The apparatus according to claim 3, wherein in a case where an image object has been moved by the operator onto an image object indicating a page, said editing means edits the form data in such a manner that if the moved image object is a page, a page corresponding to the moved image object will be added on immediately ahead of a page located at the destination of movement.

6. The apparatus according to claim 3, wherein the form data further includes double sides which include the objects of two pages, and in a case where an image object has been moved by the operator onto an image object indicating a page, said editing means edits the form data in such a manner that if the moved image object is a page and a prescribed operation is being performed along with the move operation, a double-sided object is generated that includes a page corresponding to the moved image object and a page located at the destination of movement.

7. The apparatus according to claim 3, wherein in a case where an image object has been moved by the operator onto an image object indicating a part form, said editing means edits the form data in such a manner that if the moved image object is a parts form, a parts form corresponding to the moved image object will be added on immediately ahead of a parts form located at the destination of movement.

8. The apparatus according to claim 3, wherein in a case where an image object has been moved by the operator to a position other than that of an image object, said editing means edits the form data in such a manner that if the moved image object is a parts form, a new page will be inserted at the end of the form data and a parts form corresponding to the moved image object will be inserted as a parts form included on said page.

9. The apparatus according to claim 3, wherein in a case where an image object has been moved by the operator to a position other than that of an image object, said editing means edits the form data in such a manner that if the moved image object is a page, a page corresponding to the moved image object, inclusive of a parts form included on this page, will be added onto the end of the form data.

10. The apparatus according to claim 2, wherein the operation by an operator includes an operation for moving an image object from outside the tree, and said editing means, in conformity with the manipulation of the object, adds the description of an object, which corresponds to an image object that has been moved, onto the composite form setting data that has been stored in said storage means.

11. The apparatus according to claim 2, wherein in a case where a prescribed operation has been performed by the operator when an image object is moved, said editing means performs further editing, after the editing of the form data, in such a manner that an object corresponding to an image object that has been moved by the operator is deleted from the position occupied prior to movement.

12. A composite form editing method embodied on a computer readable medium for editing form data, which is constituted of a plurality of parts forms, to be overlaid on print data, said method comprising:

a storing step, of storing composite form setting data which describes objects and a dependency relationship among these objects, wherein the objects include a page which constitutes the form data and a parts form which constitutes the page;

a displaying, step of displaying, on a display in accordance with the composite form setting data, the objects and the dependence relationship thereof as a tree which connects image objects corresponding to the objects;

a determining step, of determining a position where the image objects is dropped on the tree in accordance with an operation by an operator; and an editing step, of editing the description of the composite form setting data in accordance with the position where the image data is dropped determined in said determining step.

13. The method according to claim 12, wherein the operation by the operator includes an operation for moving or copying the image objects; and said editing step includes moving or copying, in conformity with the manipulation of an image object, the description of the object, which corresponds to the image object that has been manipulated, in the composite form setting data that has been stored in said storage step.

14. The method according to claim 13, wherein a name of the parts from constituting a page composing the form data is described in the composite form setting data as well as a type of page indicating whether a page is subject of both side printing with respect to each page.

15. The method according to claim 14, wherein, in a case where an image object has been moved by the operator onto an image object indicating a page, said editing step includes editing the form data in such a manner that if the moved image object is a parts form, a parts form corresponding to the moved image object will be added onto the end of a page located at the destination of movement.

16. The method according to claim 14, wherein, in a case where an image object has been moved by the operator onto an image object indicating a page, said editing step includes editing the form data in such a manner that if the moved image object is a page, a page corresponding to the moved image object will be added on immediately ahead of a page located at the destination of movement.

17. The method according to claim 14, wherein the form data further includes double sides which include the objects of two pages, and in a case where an image object has been moved by the operator onto an image object indicating a page, said editing step includes editing the form data in such a manner that if the moved image object is a page and a prescribed operation is being performed along with the move operation, a double-sided object is generated that includes a page corresponding to the moved image object and a page located at the destination of movement.

18. The method according to claim 14, wherein, in a case where an image object has been moved by the operator onto an image object indicating a part form, said editing step includes editing the form data in such a manner that if the moved image object is a parts form, a parts form corresponding to the moved image object will be added on immediately ahead of a parts form located at the destination of movement.

19. The method according to claim 14, wherein, in a case where an image object has been moved by the operator to a position other than that of an image object, said editing step includes editing the form data in such a manner that if the moved image object is a parts form, a new page will be inserted at the end of the form data and a parts form corresponding to the moved image object will be inserted as a parts form included on said page.

20. The method according to claim 14, wherein, in a case where an image object has been moved by the operator to a position other than that of an image object, said editing step includes editing the form data in such a manner that if the moved image object is a page, a page corresponding to the moved image object, inclusive of a parts form included on this page,—will be added onto the end of the form data.

21. The method according to claim 14, wherein the operation by the operator includes an operation for moving an image object from outside the tree, and said editing step, in conformity with the manipulation of the object, includes adding the description of an object, which corresponds to an image object that has been moved, onto the composite form setting data that has been stored in said storage step.

22. The method according to claim 13, wherein, in a case where a prescribed operation has been performed by the operator when an image object is moved, said editing step includes performing further editing, after the editing of the form data, in such a manner that an object corresponding to an image object that has been moved by the operator is deleted from the position occupied prior to movement.

23. A computer-readable storage medium storing a control program of a composite form editing method for editing form data, which is constituted of a plurality of parts forms, to be overlaid on print data, said control program comprising:

storage means for storing composite form setting data which describes objects and a dependency relationship among these objects, wherein the objects include a page which constitutes the form data and a parts form which constitutes the page;

display means for displaying, on a display in accordance with the composite form setting data, the objects and the dependency relationship thereof as a tree which connects image objects corresponding to the objects;

determining means for determining a position where the image objects is dropped on the tree in accordance with an operation by an operator; and editing means for editing the description of the composite form setting data in accordance with the position where the image object is dropped determined by said determination means.

24. The storage medium according to claim 23, wherein the operation by the operator includes an operation for moving or copying the image objects; and said editing means moves or copies, in conformity with the manipulation of an image object, the description of the object, which corresponds to the image object that has been manipulated, in the composite form setting data that has been stored in said storage means.

25. The storage medium according to claim 24, wherein a name of the parts form constituting a page composing the form data is described in the composite form setting data as well as a type of page indicating whether a page is subject of both side printing with respect to each page.

26. A composite form editing apparatus for editing form data, which is constituted of a plurality of parts forms, to be overlaid on print data, said apparatus comprising:

storage means for storing composite form setting data which describes a dependency relationship among objects, wherein the objects include a page which constitutes the form data and a parts form which constitutes the page;

display means for displaying, on a display in accordance with the composite form setting data, the objects and the dependency relationship thereof as a tree which connects image objects corresponding to the objects;

determination means for determining a position where the image objects is dropped on the tree in accordance with an operation by an operator; and editing means for editing the description of the composite form setting data in accordance with the position where the image object is dropped determined by said determination means.

27. A composite form editing method embodied on a computer readable medium for editing form data, which is constituted of a plurality of parts forms, to be overlaid on print data, said method comprising:

a storing step, of storing composite form setting data which describes a dependency relationship among objects, wherein the objects include a page which constitutes the form data and a parts form which constitutes the page;

a displaying step, of displaying, on a display in accordance with the composite form setting data, the objects and the dependency relationship thereof as a tree which connects image objects corresponding to the objects;

a determining step, of determining a position where the image objects is dropped on the tree in accordance with an operation by an operator; and an editing step, of editing the description of the composite form setting data in accordance with the position where the image object is dropped determined in said determining step.

28. A computer-readable storage medium storing a control program of a composite form editing method for editing form data, which is constituted of a plurality of parts forms, to be overlaid on print data, said control program comprising:

storage means for storing composite form setting data which describes a dependency relationship among objects, wherein the objects include a page which constitutes the form data and a parts form which constitute the page;

display means for displaying, on a display in accordance with the composite form setting data, the objects and the dependency relationship thereof as a tree which connects image objects corresponding to the objects;

determination means for determining a position where the image objects is dropped on the tree in accordance with an operation by an operator; and editing means for editing the description of the composite form setting data in accordance with the position where the image object is dropped determined by said determination means.

* * * * *

UNITED STATES PATENT AND TRADEMARK OFFICE
CERTIFICATE OF CORRECTION

PATENT NO. : 6,922,807 B1
APPLICATION NO. : 09/493110
DATED : July 26, 2005
INVENTOR(S) : Hiroki Miyata It is certified that error appears in the above-identified patent and that said Letters Patent is hereby corrected as shown below:

SHEET 4

"CORPOLATION" should read --CORPORATION--.

SHEET 13

"FROM" should read --FORM--.

COLUMN 1

Line 19, "are" should read --which are--.
Line 20, "overlaied" should read --overlaid--.
Line 41, "combination" should read --combined--.
Line 43, "constitutes" should be deleted.

COLUMN 2

Line 33, "part" should read --parts--.

COLUMN 5

Line 28, "obtained" should read --obtain--.

COLUMN 6

Line 51, "Nenkin02" should read --Nenkin02--.
Line 52, "Nenkin0.2fcp"," should read --Nenkin02.fcp",--.
Line 53, "Nenkin0.4fcp"." should read --Nenkin04.fcp".--.

COLUMN 9

Line 33, "file," should read --file--.

COLUMN 10

Line 15, "sided," should read -- sided",--.
Line 16, "destination" should read --the destination--.

UNITED STATES PATENT AND TRADEMARK OFFICE
CERTIFICATE OF CORRECTION

PATENT NO. : 6,922,807 B1
APPLICATION NO. : 09/493110
DATED : July 26, 2005
INVENTOR(S) : Hiroki Miyata It is certified that error appears in the above-identified patent and that said Letters Patent is hereby corrected as shown below:

COLUMN 12

Line 12, "in pressed," should read --pressed,--.
Line 55, "objects is" should read --objects are--.

COLUMN 13

Line 5, "from" should read --form--.

COLUMN 14

Line 10, "displaying, step" should read --displaying step,--.
Line 15, "objects is" should read --objects are--.
Line 20, "image data is" should read --image objects are--.
Line 32, "from" should read --form--.

COLUMN 15

Line 15, "–will" should read --will--.
Line 45, "objects is" should read --objects are--.

COLUMN 16

Line 14, "objects is" should read --objects are--.
Line 35, "objects is" should read --objects are--.
Line 50, "constitute" should read --constitutes--.

Signed and Sealed this

First Day of May, 2007

JON W. DUDAS
*Director of the United States Patent and Trademark Office*